United States Patent
Tondorf et al.

(10) Patent No.: US 6,470,577 B1
(45) Date of Patent: Oct. 29, 2002

(54) ANGLE MEASURING SYSTEM AND USE OF THIS ANGLE MEASURING SYSTEM IN A SPINDLE ARRANGEMENT

(75) Inventors: Sebastian Tondorf, Waging; Wolfgang Holzapfel, Obing, both of (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/666,742

(22) Filed: Sep. 20, 2000

(30) Foreign Application Priority Data

Sep. 21, 1999 (DE) .......................... 199 45 099

(51) Int. Cl.⁷ ............................................. G01B 11/26
(52) U.S. Cl. ..................... 33/1 PT; 33/DIG. 3; 33/1 N; 33/707
(58) Field of Search ................. 33/1 N, 1 PT, 33/706, 707, 708, DIG. 3, 700

(56) References Cited

U.S. PATENT DOCUMENTS

| | | | |
|---|---|---|---|
| 3,554,082 A | | 1/1971 | Faulcon |
| 3,740,160 A | | 6/1973 | Kimura et al. |
| 4,369,578 A | * | 1/1983 | Ernst ........................... 33/1 PT |
| 4,495,700 A | * | 1/1985 | Ernst ............................ 33/1 N |
| 4,616,131 A | | 10/1986 | Burkhardt |
| 4,660,288 A | | 4/1987 | Dangschat |
| 4,712,088 A | | 12/1987 | Ernst |
| 4,741,230 A | | 5/1988 | Bohner et al. |
| 5,066,857 A | | 11/1991 | Ernst |
| 5,506,579 A | | 4/1996 | Spaulding |
| 5,655,422 A | | 8/1997 | Stolz et al. |
| 5,657,544 A | * | 8/1997 | Ota et al. .................... 33/1 PT |
| 5,778,542 A | * | 7/1998 | Spoto ............................ 33/1 N |
| 6,098,295 A | * | 8/2000 | Fiechtinger ................. 33/1 PT |

FOREIGN PATENT DOCUMENTS

| | | |
|---|---|---|
| DE | 1 752 236 | 5/1971 |
| DE | 2 126 164 | 12/1971 |
| DE | 2 243 734 | 3/1974 |
| DE | 35 26 712 | 1/1987 |
| DE | 43 14 295 | 11/1993 |
| DE | 198 26 423 | 12/1999 |

OTHER PUBLICATIONS

Copy of original claims for Ser. No. 09/286,404, filed Apr. 5, 1999—Mitterreiter.
Copy of original claims for Ser. No. 09/354,047, filed Jul. 15, 1999—Metterreiter.
Copy of original claims for Ser. No. 09/365,118, filed Jul. 30, 1999—Michel et al.
Copy of original claims for Ser. No. 09/496,503, filed Feb. 2, 2000—Brandl et al.
Copy of original claims for Ser. No. 09/506,752, filed Feb. 18, 2000—Feichtinger.
Copy of original claims Ser. No. 09/674,840, filed Nov. 6, 2000—Bielski et al.

\* cited by examiner

*Primary Examiner*—Diego Gutierrez
*Assistant Examiner*—Travis Reis
(74) *Attorney, Agent, or Firm*—Brinks Hofer Gilson & Lione (57) ABSTRACT

An angle measuring device having a graduation carrier, a scanning plate, a detector arrangement on a stationary element for measuring a rotational position of the graduation carrier with respect to the scanning plate around a first axis of rotation, wherein the scanning plate with the graduation carrier is rotatable with respect to the detector arrangement around a second axis of rotation; and the first and second axes of rotation extend parallel with respect to each other and are radially distanced from each other.

21 Claims, 8 Drawing Sheets

ANGLE MEASURING SYSTEM AND USE OF THIS ANGLE MEASURING SYSTEM IN A SPINDLE ARRANGEMENT

Applicants claim, under 35 U.S.C. §119, the benefit of priority of the filing date of Sep. 21, 1999 of a German patent application, copy attached, Serial Number 199 45 099.4, filed on the aforementioned date, the entire contents of which is incorporated herein by reference.

BACKGROUND OF THE INVENTION

1. Field of the Invention

The present invention relates to an angle measuring device with a graduation carrier, a scanning plate and a detector arrangement on a stationary element for measuring the rotational position of the graduation carrier with respect to the scanning plate around a first axis of rotation. The present invention further relates to the use of this angle measuring device in a spindle arrangement.

2. Discussion of Related Art

Tool heads in which the tool is seated radially displaceable by an adjustment mechanism, are known for performing various production processes. This displacement takes place either by radially displaceable slides, on which the tool is fastened, or by a tool carrier, which is rotatably seated in the tool head and is eccentric with respect to the spindle axis, wherein the radial position of the tool fastened on the tool carrier with respect to the spindle axis changes by rotating the tool carrier in the eccentric bore of the tool head.

An exact position measurement is required in both cases for numerically controlling the setting of the radial position of the tool.

In tool heads with integrated slides, position measuring is performed by path measuring devices in that the scale is fastened on the slide, and the scanning unit on the tool head. A device of this type is described in DE 43 14 295 A1 and corresponding U.S. Pat. No. 5,655,422, the entire contents of which are incorporated herein by reference. This direct position measurement assures a precise detection of the radial position of the tool. In accordance with DE 43 14 295 A1, the measured position values are transmitted by infrared radiation, or inductively, from the rotating tool head to the stationary machine element or the numerical control device. Besides the actual measuring systems, separate transmission units are here additionally required, which make the arrangement more expensive, increase its structural size and makes it prone to malfunctions. This disadvantage was eliminated in the device in accordance with DE 35 26 712, and corresponding U.S. Pat. No. 4,741,230, the entire contents of which are incorporated herein by reference, in that for direct position measuring a photoelectric incremental measuring device with a scale and a scanning plate is integrated in the tool head, and the detector unit for detecting the light signals, which are modulated as a function of the position, is arranged in the stationary machine element.

Exclusively indirect measuring methods are known with tool heads in accordance with DE 22 43 734 A and DE 21 26 164 A1 along with its corresponding U.S. Pat. No. 3,740,160, the entire contents of which are incorporated herein by reference, having a tool carrier which is rotatably seated eccentrically with respect to the spindle axis. In this case, the rotating of the tool carrier is detected via the drive mechanism. This indirect measurement is erroneous, since transfer errors and the play of the interposed transmission elements (gears) are included in the measurement.

OBJECT AND SUMMARY OF THE INVENTION

It is therefore an object and advantage of the present invention to disclose an angle measuring device, by which the angular position of a first element in relation to a second element can be detected, wherein the first element is rotatably seated eccentrically in the second element, and the second element is rotatably seated in a stationary element.

This object and advantage is attained by an angle measuring device having a graduation carrier, a scanning plate, a detector arrangement on a stationary element for measuring a rotational position of the graduation carrier with respect to the scanning plate around a first axis of rotation, wherein the scanning plate with the graduation carrier is rotatable with respect to the detector arrangement around a second axis of rotation; and the first and second axes of rotation extend parallel with respect to each other and are radially distanced from each other.

It is a further object and advantage of the present invention to disclose a spindle arrangement with an angle measuring device, wherein a direct angle measurement of a work piece or tool carrier eccentrically rotatably seated in a head is provided, wherein the head is rotatably seated in a stationary element of the spindle.

This object and advantage is attained by a spindle arrangement having a stationary machine element, a base body seated in the stationary machine element and is rotatable around a spindle axis and a workpiece carrier seated in the base body and is rotatable around a carrier axis, wherein both the spindle axis and the carrier axis extend parallel with each other and are radially distanced from each other. The arrangement further includes a scanning plate on the base body, a graduation carrier, a detector arrangement arranged on the stationary machine element for measuring a rotational position of the graduation carrier with respect to the scanning plate around the carrier axis and wherein the scanning plate with the graduation carrier is rotatable with respect to the detector arrangement around the spindle axis.

The particular advantages of the present invention lie in that the detector arrangement can be arranged stationarily, so that a direct angle measurement of elements which are eccentrically rotated with respect to each other can be performed free of malfunctions and precisely.

The invention will be explained in greater detail in what follows by means of exemplary embodiments represented in the drawings.

DETAILED DESCRIPTION OF THE PREFERRED EMBODIMENTS

A first example of a spindle arrangement with an angle measuring device 10 integrated therein is shown in principle in FIGS. 1 to 5. It consists of a stationary machine element 1, in which a tool head 3 is seated centered and rotatable with respect to the spindle axis S.

In a manner not represented, the tool head 3 can also be fastened in a torsion-proof manner in a spindle body which, in turn, is rotatably seated in the machine element 1.

Figure 1:
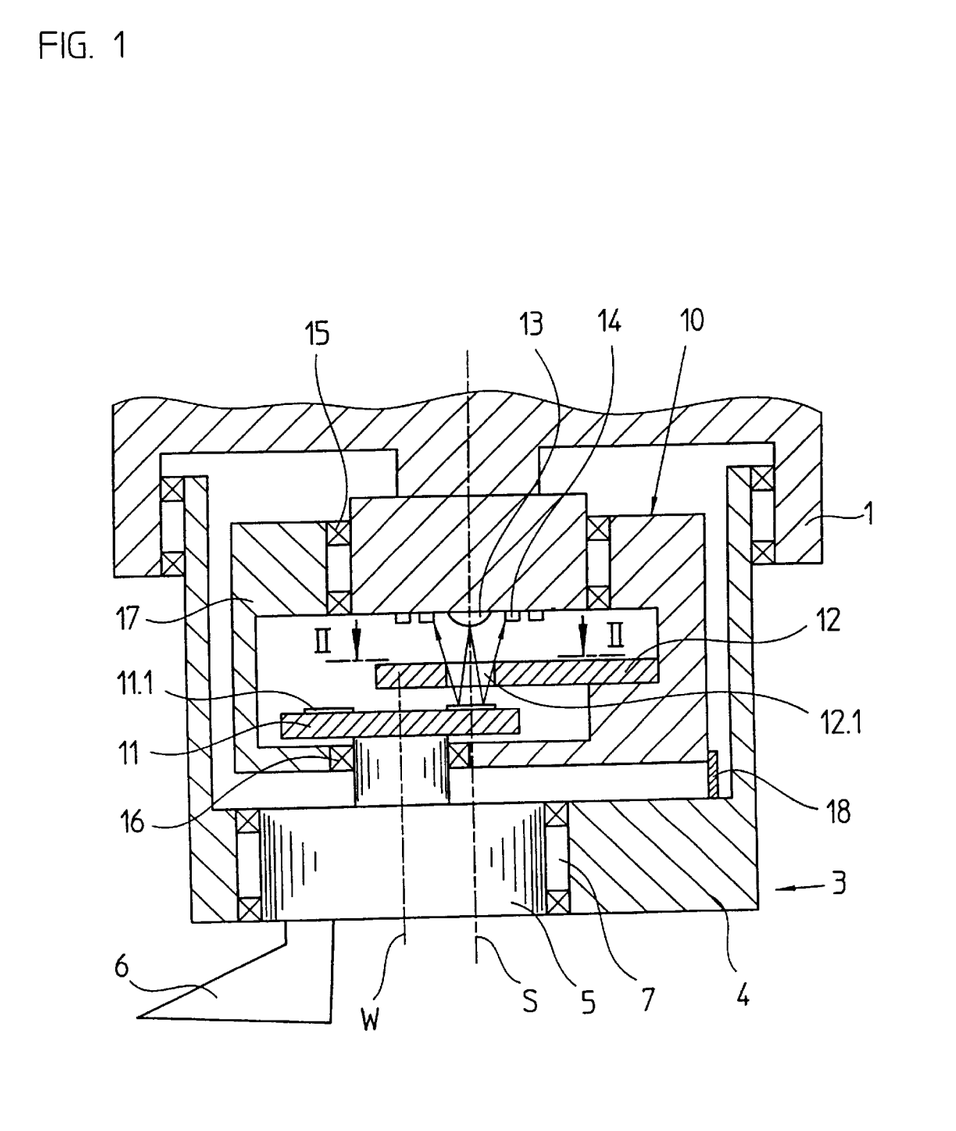
FIG. 1 shows a longitudinal section through a first embodiment of a spindle arrangement of a first embodiment of an angle measuring device according to the present invention.
Figure 2:
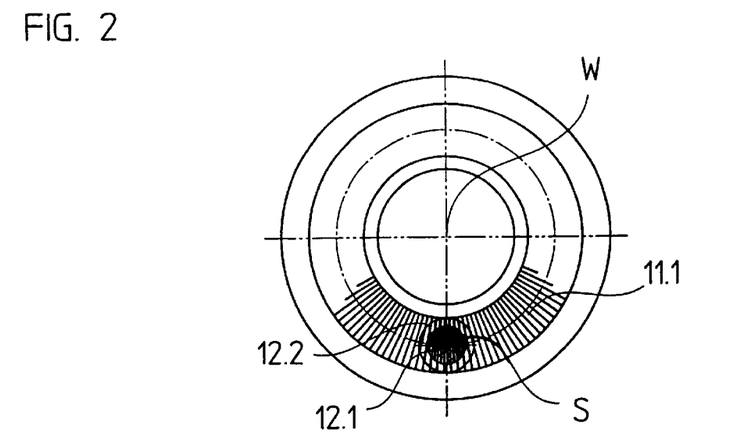
FIG. 2 shows a cross-sectional view of the spindle arrangement of FIG. 1 taken along line II—II of FIG. 2.

The tool head 3 includes a base body 4 and a tool carrier 5, which is seated therein and is rotatable around the axis W. The axis of rotation W extends parallel with the spindle axis S, but is radially offset with respect to it. For processing a workpiece, not represented, the tool carrier 5 carries a cutting tool 6, whose radial distance from the spindle axis S can be adjusted by rotating the tool carrier 5 in the eccentric bore 7 of the base body 4. Such spindle arrangements are explained in DE 22 43 734 A and DE 21 26 164 A1, for example. They are used for facing, for hollowing out bores, and in particular for processing workpieces with an exterior or interior contour differing from the circular form, for example a polygonal surface.

It is advantageous in all cases to detect the instantaneous position of the tool 6 with respect to the spindle axis S, so that a numerically controlled setting of the tool position is made possible. In accordance with the present invention, an angle measuring device 10 is provided for this purpose, which includes a graduation carrier 11, a scanning plate 12, a light source 13 and a detector arrangement 14.

For the purpose of numerically controlled displacement of the tool 6, the rotational position detected by the angle measuring device 10 can be transformed into a radius value.

With the embodiment represented in FIG. 1, the angle measuring device 10 is a separate, pre-assembled component with its own bearings 15 and 16 for seating the graduation carrier 11 and the detector device 14 in relation to the housing 17. The housing 17 is fastened in a torsion-proof manner on the base body 4, for example, by a torque support 18, which makes a radial and axial compensation possible. In the further exemplary embodiments, the angle measuring device 10 does not have its own bearings 15, 16.

The graduation carrier 11 has an incremental radial graduation 11.1, which can be photoelectrically scanned. This incremental graduation 11.1 has reflecting and non-reflecting graduation marks, also called amplitude graduations, which are alternatingly arranged in the direction of rotation, or of only reflecting graduation marks, wherein alternatingly arranged graduation marks affect the phase of an incident light beam differently (phase graduation). The graduation carrier 11 is fastened in a torsion-proof manner on the tool carrier 5 in such a way that the center of the radial graduations 11.1 coincides with the tool carrier axis W. The graduation marks extend in a star shape, starting at this tool carrier axis W. This shape is made clear in the top plan view II—II in accordance with FIG. 2.

Figure 5:
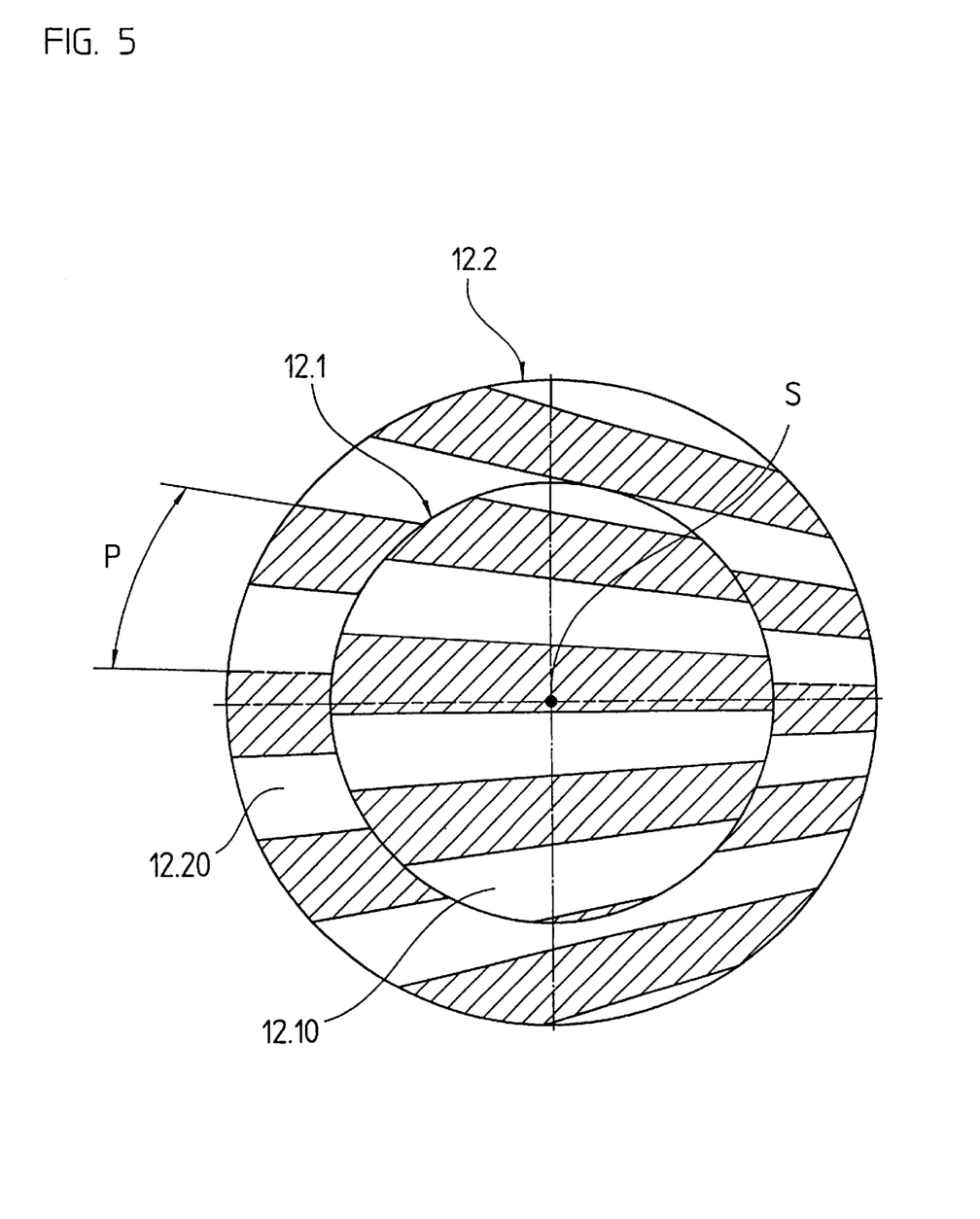
FIG. 5 is an enlarged representation of an embodiment of a scanning plate to be used with the angle measuring device of FIG. 1.

The scanning plate 12 is fastened in a torsion-proof manner on the base body 4. The scanning plate 12 has several scanning fields 12.1, 12.2 for generating several scanning signals, which are phase-shifted with respect to each other. Each scanning field 12.1, 12.2 has a scanning graduation 12.10 and 12.20 in the form of a radial graduation, whose graduation marks are aligned toward the tool carrier axis W constituting the center (FIG. 5).

Figure 3:
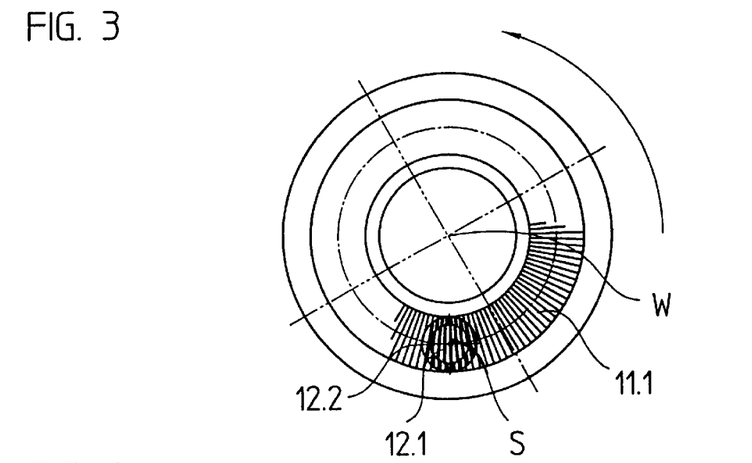
FIG. 3 shows a cross-sectional view of the spindle arrangement of FIG. 1 taken along line II—II of FIG. 1 with the tool carrier rotated with respect to the representation in accordance with FIG. 2.

Scanning of the graduation carrier 11 takes place by a scanning unit, including the light source 13 and the detector arrangement 14. The scanning unit 13, 14 is fastened in a torsion-proof manner on the machine element 1. In the course of rotating the tool carrier 5 around the tool carrier axis W inside the base body 4, the light from the light source 13 is modulated as a function of the position because of the relative movement between the radial graduations 11.1 of the graduation carrier 11 and the scanning graduations 12.10, 12.20 of the scanning fields 12.1, 12.2, and is detected by the detector arrangement 14 and converted into electrical scanning signals. Please note that FIG. 3 shows a plan view of the graduation carrier 11 and of the scanning fields 12.1 and 12.2, in which the tool carrier 5 is rotated about the axis W compared to the view in FIG. 2.

The scanning fields 12.1, 12.2 of the scanning plate 12 are arranged in such a way that a superimposition of the scanning fields 12.1, 12.2 by the radial graduation 11.1 is present in every rotational position of the base body 4 with respect to the stationary machine element 1. Each one of the scanning fields 12.1, 12.2 has a ring-shaped area, whose center is intersected by the spindle axis S. The marks of the radial graduations 12.10, 12.20 within these ring-shaped area point toward the tool axis W.

The detector arrangement 14 is arranged in the area of the spindle axis S. The scanning graduations 12.10, 12.20 are offset against each other in a known manner (FIG. 5). In actual use, four scanning fields are customarily provided instead of two scanning fields 12.1, 12.2, whose scanning graduations are each offset with respect to each other by 90° or ¼ of the graduation period P. For reasons of clarity only two scanning fields 12.1, 12.2 have been represented, wherein the innermost scanning field 12.1 becomes a point-like circle.

The detector arrangement 14 has at least one light-sensitive surface for each scanning field 12.1, 12.2. To prevent the modulation of the light from the light source 13 during a rotation of the tool head 3 around the spindle axis S while the tool carrier 5 also rotates along, it is advantageous if the center of gravity of the light-sensitive surface assigned to a scanning field 12.1 or 12.2 is located along the spindle axis S. In this case, each of the surfaces can be a ring, which is arranged concentrically with the spindle axis S, or it can have several individual surfaces, which are arranged concentrically around the spindle axis S. Graduation errors of the radial graduation 11.1 and 12.10, 12.20 are averaged over a large scanning range of the scanning fields 12.1, 12.2.

Figure 4:
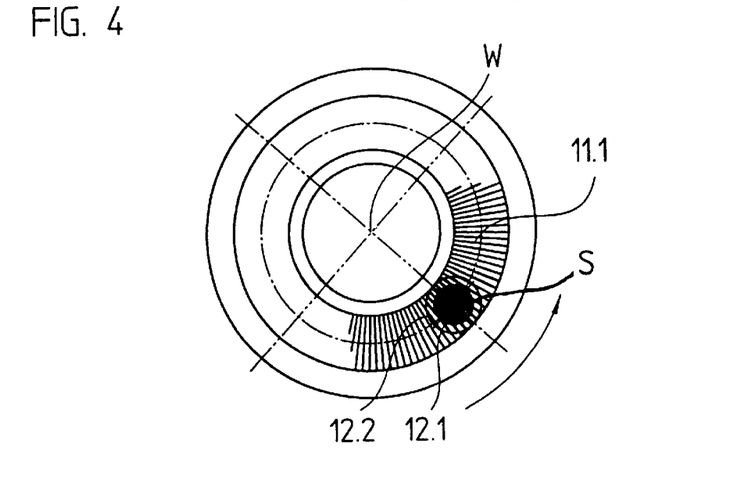
FIG. 4 shows a cross-sectional view of the spindle arrangement of FIG. 1 taken along line II—II of FIG. 1 with the spindle rotated with respect to the representation in accordance with FIG. 2.

A rotated position of the tool head 3 around the spindle axis S is represented in FIG. 4. The tool head 3 with the tool carrier 5 has turned by approximately 48° with respect to FIG. 2.

The position-dependent modulation of the light from the light source 13 is generated in the example in accordance with FIGS. 1 to 5 in that the radial graduation 11.1 of the graduation carrier 11 reflects or absorbs light as a function of the position, and the scanning graduations 12.10, 12.20 include alternating opaque and transparent graduation marks.

Figure 6:
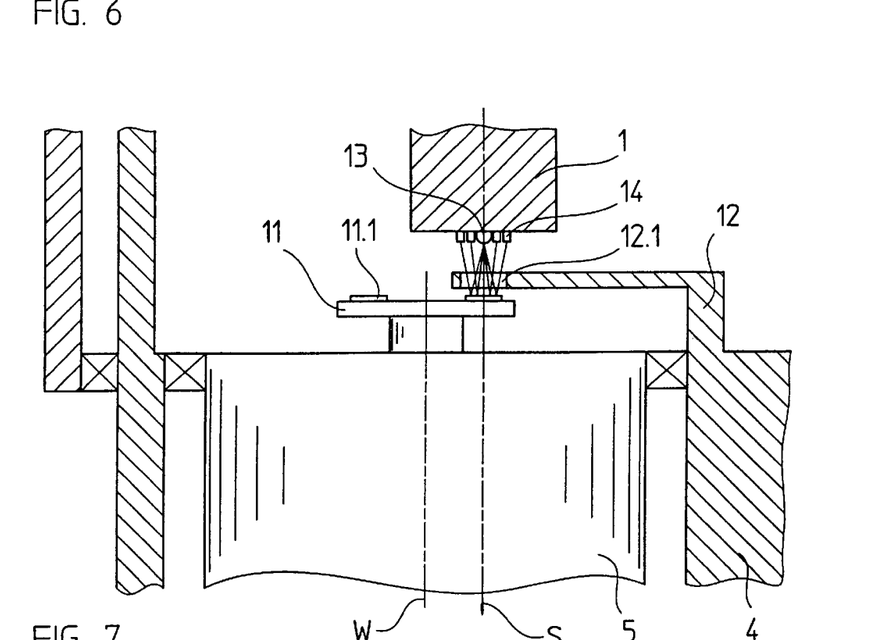
FIG. 6 shows a portion of the spindle arrangement of a second angle measuring device according to the present invention.
Figure 7:
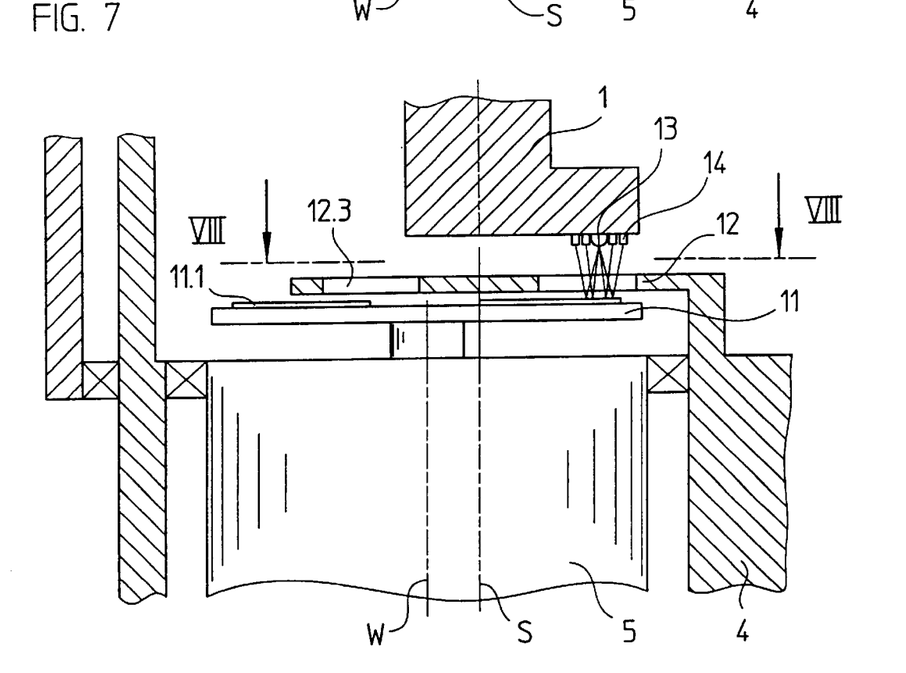
FIG. 7 shows a portion of a third embodiment of a spindle arrangement with a third embodiment of an angle measuring device in longitudinal section according to the present invention.
Figure 8:
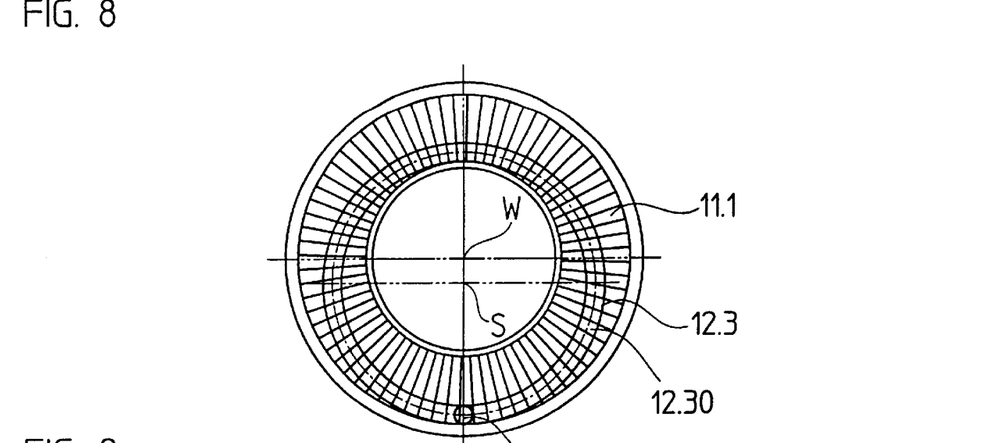
FIG. 8 shows a cross-sectional view of the spindle arrangement of FIG. 7 taken along line VIII—VIII of FIG. 7.

Alternatively to this, the radial graduation 11.1 can have alternating opaque and transparent graduation marks, and the scanning graduations 12.10, 12.20 can have alternating reflecting and absorbing areas. This arrangement is schematically represented in FIG. 6.

The arrangements in FIGS. 1 to 6 have the advantage of a compact scanning plate 12 and are particularly suited for large distances between the axes S and W, since the diameter of the graduation carrier 11 approximately corresponds to twice the eccentricity, and since with large diameters the resolution of the angle measurement increases and the measuring errors decrease.

With relatively small eccentricities, the detector arrangement is arranged remote from the spindle axis S, which will be explained with the aid of FIGS. 7 to 11. The spindle arrangement corresponds to that of the previous examples. The graduation carrier 11 is again fastened on the tool carrier 5, and the scanning plate 12 on the base body 4. The radial graduations 11.1 of the graduation carrier 11 and of the scanning field 12.3 again extend in a star shape toward the tool carrier axis W constituting the common center. The scanning field 12.3 again extends concentrically around the spindle axis S in a ring shape, and the detector arrangement 14 is fastened in a torque-proof manner on the stationary machine element 1. The graduation marks of the radial graduation 11.1 are at least as long as the radial distance between the two axes S and W. Here, the length is the extension in the direction of the tool axis W.

The light-sensitive surface of the detector arrangement 14 assigned to the scanning field 12.3 detects a plurality of graduation periods of the radial graduations 11.1 and 12.30, the same as in FIGS. 1 to 6, so that the averaging of graduation errors results and the scanning signal is only modulated by thee relative rotation between the tool carrier 5 and the base body 4 and remains unaffected, at least to a large degree, by the relative rotation between the base body 4 and the stationary machine element 1.

In a manner not shown it is again advantageous if the center of gravity of the light-sensitive surface, or light-sensitive surfaces, of a scanning field 12.3 lies in the spindle axis S. Good averaging of the widths of the marks on the radial graduation 11.1 and the scanning graduation 12.30 is achieved by this.

Figure 9:
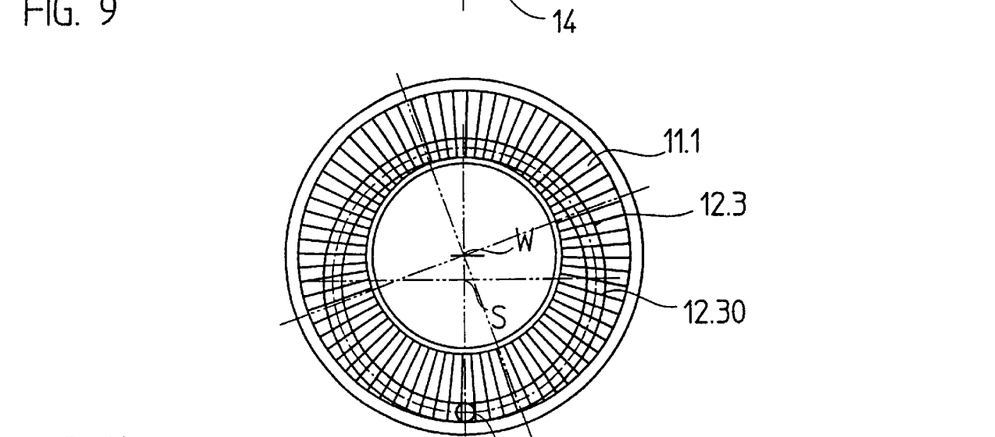
FIG. 9 shows a cross-sectional view of the spindle arrangement of FIG. 7 taken along line VIII—VIII of FIG. 7 with the tool carrier rotated with respect to the representation in accordance with FIG. 8.
Figure 10:
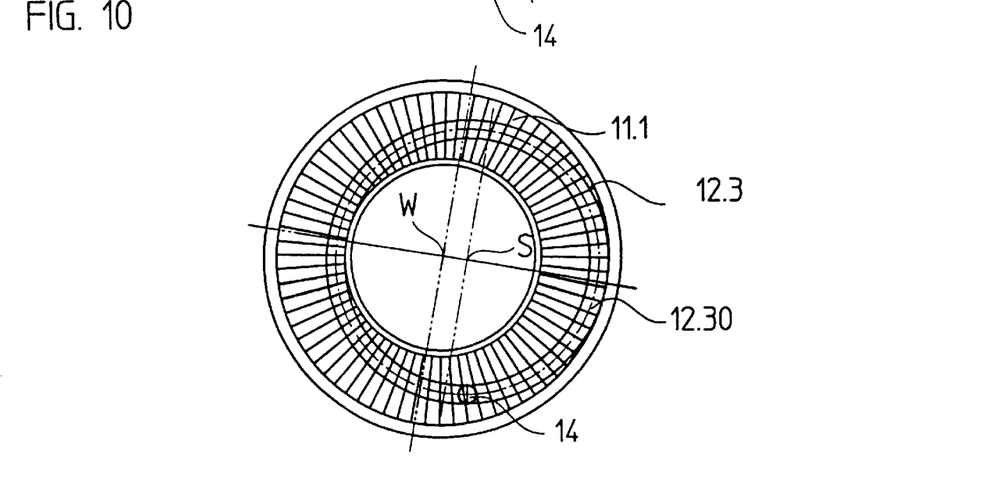
FIG. 10 shows a cross-sectional view of the spindle arrangement of FIG. 7 taken along line VIII—VIII of FIG. 7 with the spindle rotated with respect to the representation in accordance with FIG. 8.

A rotation of the tool carrier 5 with respect to the base body 4 is represented in FIG. 9. A modulation of the flow of light by the graduation carrier 11 and the scanning plate 12 takes place.

In contrast to this, no modulation results from a rotation of the base body 4 around the spindle axis S (FIG. 10), or the modulation generated by the relative rotation between the tool carrier 5 and the base body 4 remains unaffected, at least to a large degree.

Figure 11:
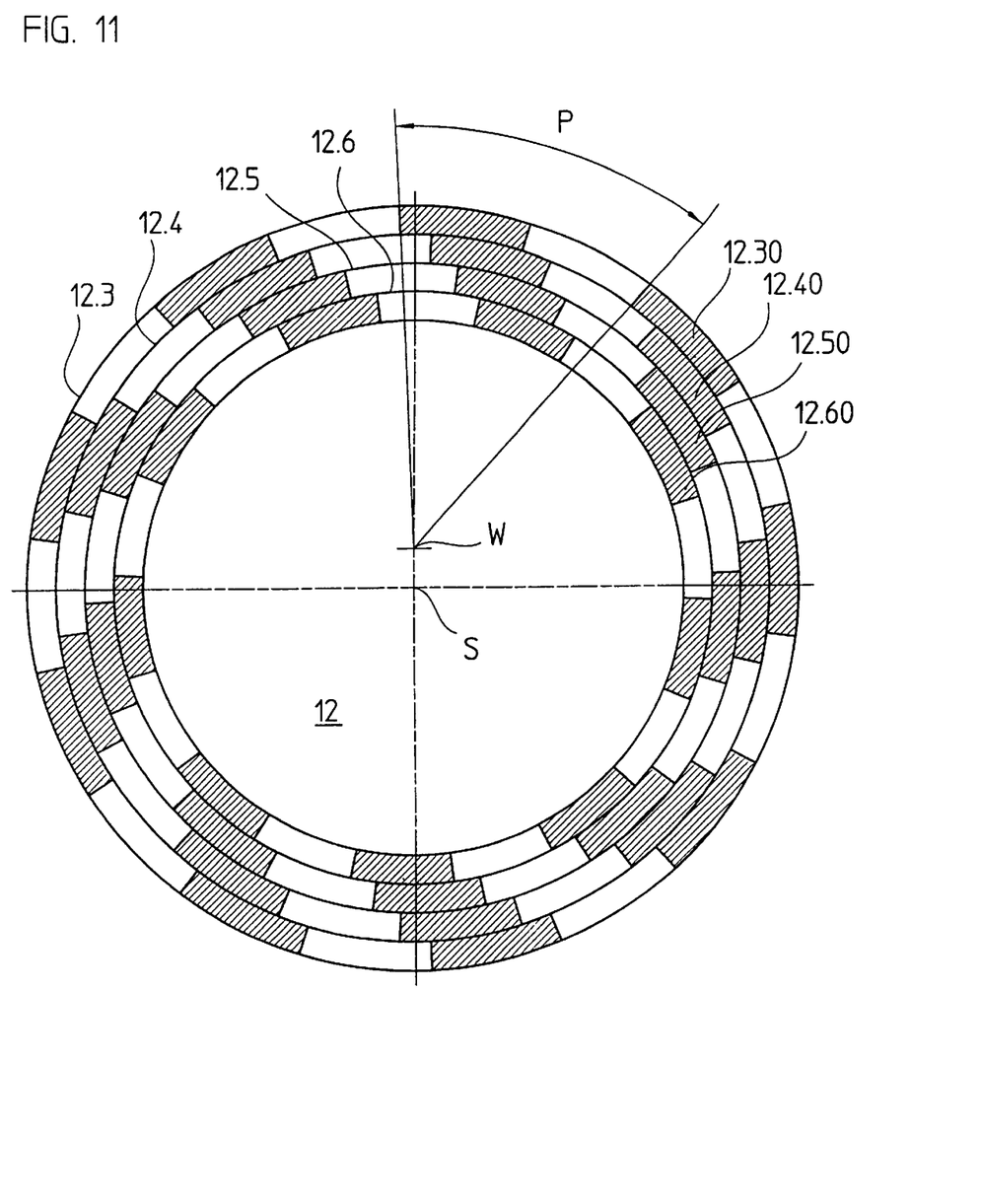
FIG. 11 is an enlarged representation of a second embodiment of a scanning plate to be used with the angle measuring device of FIG. 7.

A scanning plate with four scanning fields 12.3, 12.4, 12.5, 12.6 is represented in FIG. 11. The scanning graduations 12.30, 12.40, 12.50, 12.60 are each offset with respect to each other by ¼ of the graduation period P. Each graduation period P includes an opaque (represented in hatching) and a transparent area.

Figure 12:
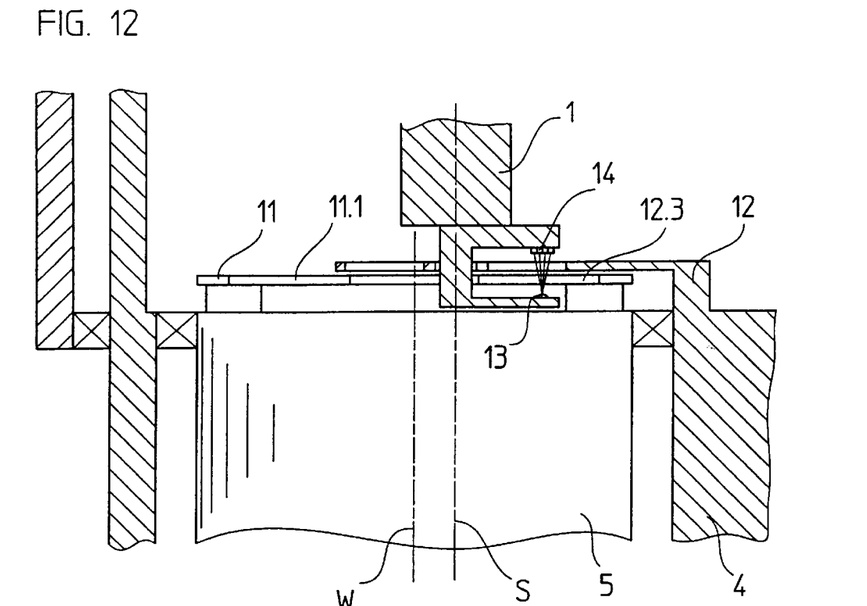
FIG. 12 shows a portion of a fourth embodiment of a spindle arrangement with a fourth embodiment of an angle measuring device according to the present invention in longitudinal section.

A so-called transmitted light version of the angle measuring device is represented in FIG. 12. There, the light source 13 is located on one side of the graduation carrier 11, and the detector arrangement 14 on the other side. Light passes through each of the radial graduations 11.1 and 12.30, and they therefore include alternating opaque and transparent areas.

With the described spindle arrangement, the tool carrier 5 is rotated as a function of the instantaneous rotational position of the base body 4 in the stationary machine element 1 for processing workpieces with an inner or outer contour which is different from the circular shape, in particular polygon-like surfaces. The rotating movement around the axis W is numerically controlled as a function of the rotational position of the base body 4 around the axis S. Such spindle arrangements are also used as workpiece carriers. In place of the tool 6, a workpiece is fastened on them and is moved, for example numerically controlled, to a lathe or machining tool. Such an arrangement is described in DE 17 52 236 A and corresponding U.S. Pat. No. 3,554,082, the entire contents of which are incorporated herein by reference.

Figure 13:
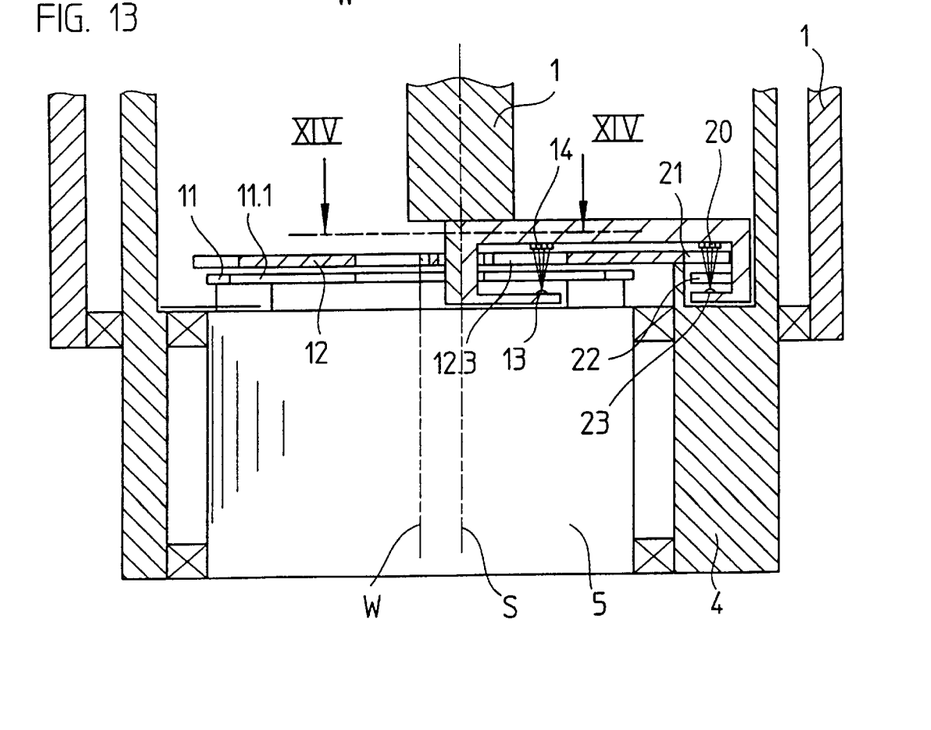
FIG. 13 is a longitudinal section through a fifth embodiment of a spindle arrangement with a fifth embodiment of an angle measuring device according to the present invention.

To also design the angle measuring device for these requirements, in accordance with FIG. 13 a further detector arrangement 20 is provided on the stationary machine element 1. A second radial graduation 21 is provided on the scanning plate 12 concentrically with respect to the spindle axis W. The graduation marks of the radial graduation 21 are oriented toward the center S. A scanning graduation 22, known per se, is attached to the stationary machine element 1 for scanning the radial graduation 21. The light source 13, or a separate light source 23, can be provided for illuminating the radial graduation 21, the scanning graduation 22 and the detector arrangement 20.

Figure 14:
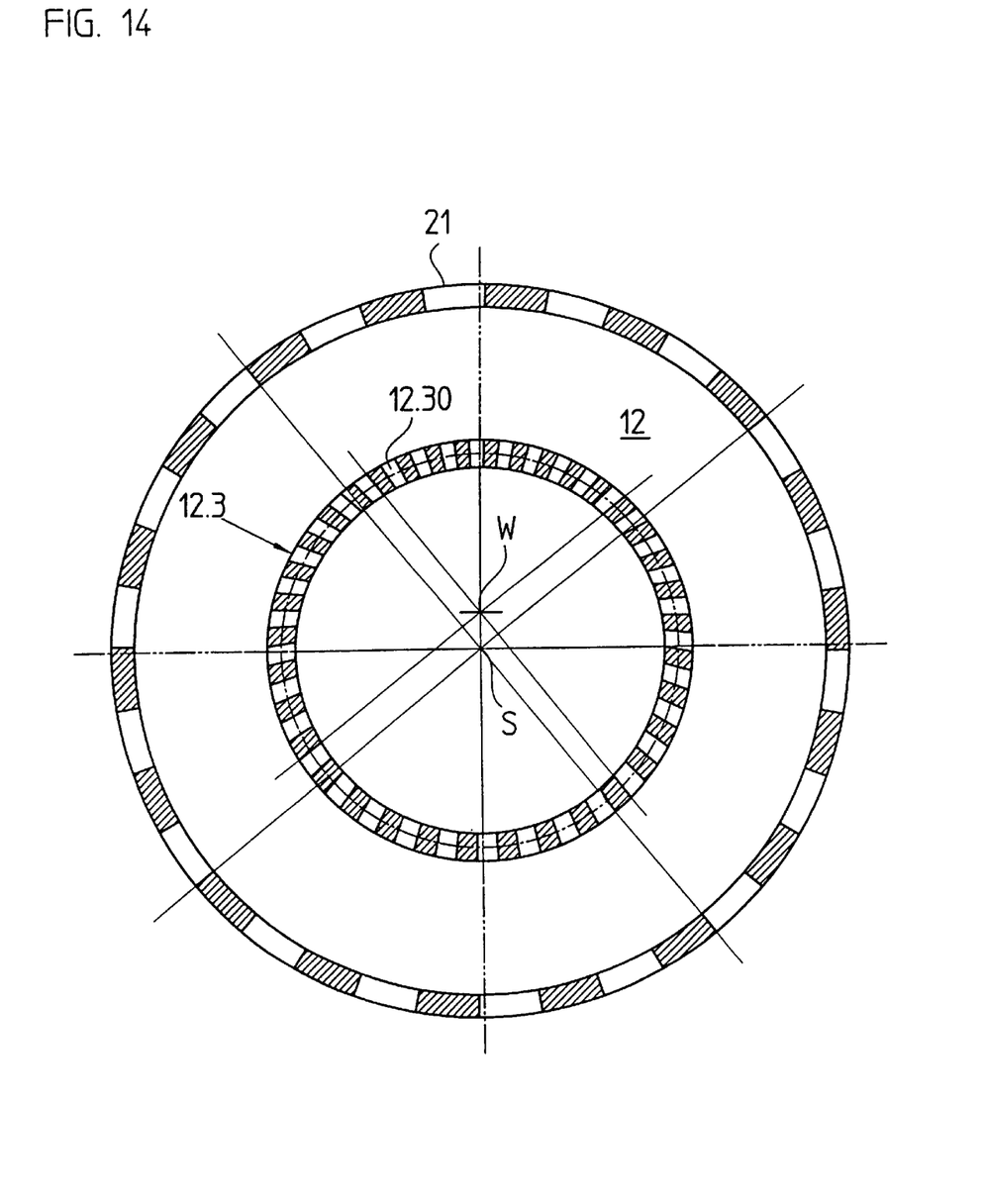
FIG. 14 shows a cross section XIV—XIV in accordance with FIG. 13.

The scanning plate 12 with the radial graduations 12.30 and 21 is represented in a top plan view in FIG. 14.

The scanning unit 22 can constitute a common unit together with the detector arrangement 20, in this case the light-sensitive surfaces can also be embodied as the scanning graduation 22. Furthermore, the scanning arrangement 20, 22 is not limited to the light-sensitive principle, the radial graduation 21 can also be designed so that it can be inductively, capacitively or magnetically scanned.

The graduation periods or the angle position of the radial graduations 11.1, 12.10, 12.20, 12.30, 12.40, 12.50, 12.60 and 21 can be designed in such a way that known vernier or moire scanning principles can be used.

Alternatively, the light source 4 can also be arranged in the base body 4, and the electrical supply of the light source can be provided by means of a battery integrated into the base body 4, or it can be provided from the stationary machine element 1 to the base body 4 via coils or collector ring transmission.

The radial graduations 11.1, 21 can be designed to be incrementally or absolutely coded, single-tracked or multi-tracked.

The graduation carrier 11 can also have a segment with a radial graduation 11.1 of less than 360°.

Along with the variants described above of the optical position measuring arrangement of the invention, alternative embodiments naturally also exist within the scope of the present invention.

We claim:

1. An angle measuring device comprising:
   a graduation carrier which is rotatable around a first axis of rotation;
   a scanning plate fixed on a base body, the scanning plate is rotatable around a second axis of rotation independent of a rotational position of the graduation carrier;
   a detector arrangement on a stationary element for measuring a rotational position of the graduation carrier with respect to the scanning plate around the first axis of rotation;
   wherein the base body, the scanning plate and the graduation carrier are rotatable with respect to the detector arrangement around the second axis of rotation; and
   the first and second axes of rotation extend parallel with respect to each other and are radially distanced from each other.

2. The angle measuring device in accordance with claim 1, wherein the scanning plate comprises a scanning field that extends concentrically with respect to the second axis of rotation.

3. The angle measuring device in accordance with claim 2, wherein the graduation carrier and the scanning plate each have a radial graduation, whose graduation marks are mutually oriented toward the first axis of rotation.

4. The angle measuring device in accordance with claim 1, wherein the graduation carrier and the scanning plate each have a radial graduation, whose graduation marks are mutually oriented toward the first axis of rotation.

5. The angle measuring device in accordance with claim 1, wherein the detector arrangement is arranged in the area of the second axis of rotation, and the scanning field is arranged in a circular ring shape around the second axis of rotation, and the diameter of the circular ring is less than or equal to the length of the graduation marks of the radial graduation of the graduation carrier.

6. The angle measuring device in accordance with claim 1, wherein the detector arrangement is at a distance from the second axis of rotation which is greater than the radial distance between the first and second axes of rotation, and the scanning field forms a circle, which extends concentrically with respect to the second axis of rotation and includes both the first and second axes of rotation.

7. The angle measuring device in accordance with claim 1, wherein the graduation carrier can be photoelectrically scanned and that the detector arrangement comprises a light-sensitive surface, which is assigned to the scanning field, and that the center of gravity of the light-sensitive surface is located along the second axis of rotation.

8. The angle measuring device in accordance with claim 1, further comprising:
   a second detector arrangement on the stationary element; and
   wherein the scanning plate comprises a graduation, which can be scanned by the second detector arrangement for detecting the rotational position of the scanning plate in relation to the stationary element.

9. The angle measuring device in accordance with claim 8, wherein the scanning plate comprises a radial graduation, whose graduation marks are oriented toward the second axis of rotation.

10. A spindle arrangement, comprising:
    a stationary machine element;
    a base body seated in the stationary machine element and is rotatable around a spindle axis;
    a carrier seated in the base body and is rotatable around a carrier axis in the base body, wherein both the spindle axis and the carrier axis extend parallel with each other and are radially distanced from each other;
    a scanning plate fixed on the base body;
    a graduation carrier on the carrier;
    a detector arrangement arranged on the stationary machine element for measuring a rotational position of the graduation carrier with respect to the scanning plate around the carrier axis; and
    wherein the base body, the scanning plate and the graduation carrier are rotatable with respect to the detector arrangement around the spindle axis.

11. The spindle arrangement in accordance with claim 10, wherein the scanning plate comprises a scanning field that extends concentrically with respect to the spindle axis.

12. The spindle arrangement in accordance with claim 11, wherein the graduation carrier and the scanning plate each have a radial graduation, whose graduation marks are mutually oriented toward the carrier axis.

13. The spindle arrangement in accordance with claim 10, wherein the graduation carrier and the scanning plate each have a radial graduation, whose graduation marks are mutually oriented toward the carrier axis.

14. The spindle arrangement in accordance with claim 10, wherein the detector arrangement is arranged in the area of the spindle axis, and the scanning field is arranged in a circular ring shape around the spindle axis, and the diameter of thy circular ring is less than or equal to the length of the graduation marks of the radial graduation of the graduation carrier.

15. The spindle arrangement in accordance with claim 10, wherein the detector arrangement is at a distance from the spindle axis which is greater than the radial distance between the spindle and carrier axes, and the scanning field forms a circle, which extends concentrically with respect to the spindle axis and includes both the carrier and spindle axes.

16. The spindle arrangement in accordance with claim 10, wherein the graduation carrier can be photoelectrically scanned and that the detector arrangement comprises a light-sensitive surface, which is assigned to the scanning field, and that the center of gravity of the light-sensitive surface is located along the spindle axis.

17. The spindle arrangement in accordance with claim 10, further comprising:
    a second detector arrangement on the stationary machine element; and
    wherein the scanning plate comprises a graduation, which can be scanned by the second detector arrangement for detecting the rotational position of the scanning plate in relation to the stationary machine element.

18. The spindle arrangement in accordance with claim 17, wherein the scanning plate comprises a radial graduation, whose graduation marks are oriented toward the spindle axis.

19. The spindle arrangement in accordance with claim 10, wherein the carrier comprises a workpiece carrier.

20. The spindle arrangement in accordance with claim 10, wherein the carrier comprises a tool carrier.

21. The spindle arrangement in accordance with claim 10, wherein the scanning plate is rotatable around an axis independent of a rotational position of the graduation carrier.

* * * * *

UNITED STATES PATENT AND TRADEMARK OFFICE
CERTIFICATE OF CORRECTION

PATENT NO.    : 6,470,577 B1
DATED         : October 29, 2002
INVENTOR(S)   : Sebastian Tondorf et al.

It is certified that error appears in the above-identified patent and that said Letters Patent is hereby corrected as shown below:

<u>Column 8,</u>
Line 32, delete "thy" and substitute -- the -- in its place.

Signed and Sealed this

Ninth Day of December, 2003

JAMES E. ROGAN
*Director of the United States Patent and Trademark Office*